United States Patent Office.

CHARLES M. HIGGINS, OF NEW YORK, N. Y.

ADHESIVE COMPOUND.

SPECIFICATION forming part of Letters Patent No. 642,331, dated January 30, 1900.

Original application filed December 31, 1898, Serial No. 700,837. Divided and this application filed November 1, 1899. Serial No. 735,554. (No specimens.)

*To all whom it may concern:*

Be it known that I, CHARLES M. HIGGINS, a citizen of the United States, residing at New York, (Brooklyn,) in the county of Kings and State of New York, have invented a certain new and useful Improvement in Adhesive Pastes, of which the following is a specification.

The main object of my invention is to produce a white dextrine paste in a manner which will be cheaper to manufacture and will produce a product of better and more uniform quality than that produced by the methods heretofore employed.

In the manufacture of dextrine pastes heretofore the dextrine is first produced in a dry powdered form by impregnating potato or corn starch with a small percentage of a converting-acid and agitating the same in a heated drum or chamber until the starch is all converted into the form of a soluble white dextrine powder. This powdered white dextrine is then dissolved in hot water in the proportion of between four and six pounds to the gallon, and the hot liquid solution of dextrine is then cooled and set into a non-fluid or pasty form, such as described in my United States Patent No. 546,401, of September 17, 1895. One objection or difficulty found in this method is due to the variations in the dextrines produced by the dry process, for in the manufacture of this dry dextrine great care has to be used to arrest the conversion at the right point and prevent its being carried so far as to go beyond the stage of the white dextrine into the yellow stage, and thus produce a product which would be too soluble, too fluid, and too dark and which would thus be more or less unfit for paste-making. Now this point is very difficult to regulate or control exactly on account of the practical impossibility of regulating the heat through a large mass of dry powder, and hence, as a matter of fact, all commercial white dextrines vary more or less in color and solubility in individual lots. These variations always exist in some degree with white potato dextrine, but in much more marked degree with white corn dextrine, which always varies much more in solubility and viscosity than the potato dextrines and always possesses a much darker color than the potato dextrine, so much so that no really true white dextrine has yet been commercially produced from corn-starch. Hence these unavoidable variations in the color, solubility, and viscosity of the dry white dextrine as now found in commerce cause corresponding variations in all pastes made with them by the present process, whereas in the case of the cheaper corn dextrine its color is so dark, its viscosity so much less, and its variations so much more that its use is precluded altogether in the manufacture of fine white dextrine pastes.

Now the object of my present improvement is to enable a pure white dextrine paste to be produced from corn or other starch in a simpler and less expensive manner than by the old method and in a way which will avoid all these variations and enable the dextrine paste to be produced uniform in color and consistency at will, and particularly from corn-starch alone. To this end I digest the starch in hot water impregnated with a digesting acid or agent in the proportion of about five pounds of the starch to the gallon of water, and I continue the digestion until the starch becomes completely fluent and converted into veritable white dextrine, and I then arrest the digestion at this stage and add a neutralizing alkali, and finally cool the solution and cause it to assume a soft unctuous pasty form. By this process I can produce very rapidly from corn-starch a white dextrine paste having a pure white color and of a uniform or easily-regulated consistency and at much less cost than by the old process; and a marked advantage of this process is that I can employ common corn-starch only and yet produce a pure white soft unctuous dextrine paste equal in color and consistency and superior in adhesiveness to that produced from pure potato dextrine at about half the cost thereof, which is a most important result.

My invention therefore consists in the product of the above-outlined process, as hereinafter fully set forth and claimed, the process itself forming the subject-matter of my application for a "Process of Making Adhesive Pastes," filed December 31, 1898, Serial No. 700,837, of which the present application is a division.

In describing the practical working of my invention I will first give a model or preferred formula with the preferred proportions and kind of ingredients for producing the most preferred product of this invention.

To one gallon or eight pounds of water add one fluid ounce of muriatic or equivalent acid and preferably three ounces avoirdupois of boracic acid, and when these acids are fully mixed or dissolved in the water add five to six pounds of raw powdered starch, preferably corn-starch, and mix the same together thoroughly, so as to produce a uniform milky mixture. I generally prefer to have the acid water heated to about 150° or 155° when the starch is added; but the acid water may be cold, if desired, when the starch is added and heat applied subsequently. The mixture of starch and acidulated water should be kept stirred or agitated to prevent the settling of the starch, and at the same time heat should be applied to raise the temperature of the mixture. The heating and stirring should be continued until a temperature near to, but below, the jellifying-point of the starch is reached—say between 150° to 165° Fahrenheit. I generally prefer a limiting temperature of about 150° to 155°, or just where the starch-milk begins to thicken into a "starch-cream," but does not actually jellify. When this point is reached, I arrest the heat and keep the mass at or near that temperature for sometime—say from one-half to one hour or more, according to circumstances. During this time and at this temperature conversion or digestion of the starch will go on continuously and effectively, so that at the end of the half-hour or more it will be found that the starch will have become soluble and have lost its jellifying power without ever having entered the stiff pasty or gelatinous condition at all, which it would do were the digesting temperature carried to or above the jellifying-point at the outset. Hence as soon as this digested condition is reached I then raise the temperature above the jellifying-point, when the creamy starchy mass will immediately melt or liquefy without passing through the stiff rubbery pasty stage and will then assume different successive degrees of liquidity as the temperature rises. The length of time necessary to effect this change will of course vary according to the size of the mass acted on, the quantity and temperature of the heat applied, the density of the starch mixture, and the strength of acid solution, as chemists will readily understand; but a period of one-half hour to one hour near or at the jellifying temperature will generally be sufficient in all cases to render the starch non-gelatinous and capable of complete and immediate liquefaction as soon as the temperature is raised above this point. In the formula given when the temperature reaches 170° the consistency of the solution will usually be a liquid opalescent jelly. When it reaches 180° to 185°, it will be quite liquid and at about 190° very liquid. It will generally not be necessary to heat the solution above 195° or 200° unless very dense solutions are used. It will be necessary, however, to continue the digestion for a few minutes past both the stages which I term, respectively, the "glutinous" and the "soluble" stages, and to advance the digestion into the stage of what is distinguished as "white dextrine," where the digestion should then be arrested. Where part of the digestion is conducted at a temperature below the jellifying-point of the starch, as described, it will only be necessary to continue the digestion at a temperature of about 180° to 195° Fahrenheit for a few minutes—say about ten to twenty minutes—in order to produce the true stage of white dextrine where the blue and violet reaction with iodin completely disappears and a distinct purple or reddish-purple coloration shows with the iodin test. When this point is reached, the heat is stopped and the digestion arrested, and the acid is then neutralized. For this purpose I prefer to use in the formula given one and one-half fluid ounces of caustic-soda lye at 40° Baumé, which will more than neutralize the amount of acids used and will give the mixture a slight alkaline reaction, which is generally preferred. The neutralized liquid is then run into jars or other receptacles and allowed to cool and set into a soft pasty form. When thus cooled and set, the product will be a very pure white paste of a soft unctuous pulpy consistency, spreading very smoothly and easily, having little tendency to strike into or warp the paper, with a great adhesive power, quick to adhere, and quick to dry, and one great advantage of this system is that the paste made by this process from corn-starch entirely will be equal to or superior to the pastes made from pure potato dextrine by the old process and at about one-half the cost, which is a most important advance in the art. Another great advantage is that the product will be much more uniform in color, consistency, and adhesive qualities than is possible with pastes made from either corn or potato dextrines by the old process. By the old process it has not been possible to make a pure white unctuous paste from corn dextrines, whereas by this process I can make such a paste entirely from corn-starch, which is superior in color, consistency, and adhesiveness to that made from the more expensive white potato dextrine.

It is proper that I should here state that the stage of white dextrine at which the digestion of the starch is arrested in this process is readily fixed, defined, and determined by the facts that at this point the blue and violet coloration with iodin completely disappears and a distinct purple or reddish purple is produced with the iodin test and by the facts that the color of the paste solution when cooled is an opaque porcelain white and its consistency a soft unctuous pulp non-fluid at rest. Per contra, the stage of yellow or "erythro" dextrine would give a distinct red or brownish color with iodin without the positive purple, and the color of the solution when cooled would be a more or less transparent amber and its consistency more or less syrupy fluid. On the other hand, where the digestion is arrested before the dextrine stage is reached, as in my Patent No. 579,827, of March 30, 1897, the color reaction would be violet or violet inclining to purple, and the consistency of the cooled solution would be more or less glutinous and not the soft unctuous pulpy consistency produced by the above-outlined process.

It may be observed that the great advantage of starting the digestion below or at the jellifying-point and continuing it until the starch loses its gelatinous quality and then finishing the digestion is that much more uniform digesting action is obtained, as the whole mass is acted upon uniformly at once, the temperature and chemical action being uniform throughout the mass, far less power is required to stir the mass, and the time for completing the process is reduced, and the product of each lot is rendered very uniform in color, consistency, and adhesive qualities, which combined result has been a great desideratum.

It will be noted that I prefer that the first stage of the digestion be conducted at a temperature near to, but below, the jellifying-point of the starch; but I in no way limit myself to this special mode of applying or conducting the heating operation, as the heat may be applied in any other suitable or ordinary way, provided the digestion is carried to the stage of white dextrine and arrested there, as already described.

The product of the complete process will be quite distinguishable from the product of my Patent No. 579,827, of March 30, 1897. In that case the density of solution, degree of conversion, and adhesive and spreading qualities are all different. In the former patent the conversion is arrested in the "glutinous" or "soluble" stage and is not carried over into the actual dextrine stage. The average density of starch solution in the former case is less—say about four pounds to the gallon—and the consistency is more glutinous or glue-like. In the present process a minimum density of about five pounds—that is, from four and one-half to five pounds of starch to the gallon of water—is necessary for the desired result, and, furthermore, the conversion is carried beyond the glutinous or soluble stage completely over into the first dextrine stage, where the blue-color reaction with iodin disappears and where the purple or reddish color shows positively. The final consistency of this product is not glutinous or glue-like, but soft and unctuous, so as to spread very easily and smoothly, yet adhere and dry quickly and not sink into the paper as much as a less dense, but more glutinous mixture, would be likely to do. Consequently the present product is more especially adapted for very particular uses, such as for fine mounting purposes, where the particular consistency and qualities specified are of special importance and value and for which the more expensive potato dextrines made by the dry process have heretofore been used.

My improved product can be readily distinguished from a paste made from potato dextrine by the old process, as my new product will be more uniformly white and will have a firmer unctuous consistency and possess greater adhesiveness, and in addition to this distinction my product can also be readily and positively distinguished by microscopic test. In the conversion of the starch into dextrine many of the granules of the starch will retain substantially their original shape, and as the granules of potato and corn starch differ very much in size and form my improved product can thus be readily distinguished by the microscope from a product of potato dextrine.

A greater density than five to six pounds to the gallon of water may be used for some especial pastes; but in such cases I prefer to carry the digestion a little farther still, so that the color reaction with iodin will be a very reddish purple, but still well within the white dextrine stage; but for most purposes the range of a little less than five pounds up to six pounds will produce the best results.

I prefer to conduct the first stage of the digestion, as described, at a temperature near to, but below, the jellifying-point—say 145° to 155° Fahrenheit; but a much lower temperature than this can be used, if desired. If, however, a lower temperature is used, a longer time or more acid will be required for the digestion or to render the starch non-gelatinous, and vice versa, as will be understood.

Of course I do not limit myself to any particular kind of acid or digesting agent employed, nor to any kind of neutralizing substance, nor to any exact amount of the digesting or neutralizing agents, which may be increased or diminished. In some cases the neutralizing substance may be omitted where a slight trace of acid in the paste will not be objectionable.

It will not be necessary in all cases to cool the digested starch solution into the pasty form, as the solution may be retained in the hot liquid stage at the proper digested point, after which the temperature may be reduced somewhat and then used for some special purpose while still hot and liquid, as will be understood.

What I claim as new is—

The product of the process herein described, viz: an improved paste made from corn-starch, water and a digesting agent in the proportions of about five pounds of starch to eight pounds of water, and having the qualities set forth, viz., a pure white color, a dextrine reaction, soft, pulpy or unctuous consistency and great adhesiveness, substantially as set forth.

In testimony whereof I affix my signature, in the presence of two witnesses, this 28th day of October, 1899.

CHAS. M. HIGGINS.

Witnesses:
JNO. E. GAVIN,
T. E. ROBERTSON.